US008512874B2

(12) United States Patent
Darolia et al.

(10) Patent No.: US 8,512,874 B2
(45) Date of Patent: *Aug. 20, 2013

(54) COATING SYSTEMS CONTAINING BETA PHASE AND GAMMA-PRIME PHASE NICKEL ALUMINIDE

(75) Inventors: Ramgopal Darolia, West Chester, OH (US); Joseph David Rigney, Milford, OH (US); Gillion Herman Marijnissen, Beringe (NL); Eric Richard Irma Carolus Vergeldt, Velden (NL); Annejan Bernard Kloosterman, Meppel (NL)

(73) Assignee: General Electric Company, Schenectady, NY (US)

( * ) Notice: Subject to any disclaimer, the term of this patent is extended or adjusted under 35 U.S.C. 154(b) by 1103 days.

This patent is subject to a terminal disclaimer.

(21) Appl. No.: 11/757,521

(22) Filed: Jun. 4, 2007

(65) Prior Publication Data

US 2011/0003170 A1 Jan. 6, 2011

Related U.S. Application Data

(60) Division of application No. 10/904,844, filed on Dec. 1, 2004, now Pat. No. 7,326,441, which is a continuation-in-part of application No. 10/904,220, filed on Oct. 29, 2004, now Pat. No. 7,264,888.

(51) Int. Cl.

| | |
|---|---|
| ***B32B 15/04*** | (2006.01) |
| ***C22C 19/05*** | (2006.01) |
| ***C23C 30/00*** | (2006.01) |
| ***F01D 5/28*** | (2006.01) |

(52) U.S. Cl.

USPC ........ 428/632; 428/679; 428/680; 416/241 R; 420/445; 420/447; 420/449; 427/405

(58) Field of Classification Search

USPC ...... 427/383.1, 327, 328, 250, 252; 416/223, 416/241 R, 241 B

See application file for complete search history.

(56) References Cited

U.S. PATENT DOCUMENTS 4,031,274 A * 6/1977 Bessen .......................... 148/527
4,758,480 A 7/1988 Hecht et al.

(Continued)

FOREIGN PATENT DOCUMENTS

WO WO9205298 4/1992
WO WO0175192 10/2001

OTHER PUBLICATIONS

Pomeroy M J: "Coatings for gas turbine materials and long term stability issues" Material and Design, London, GB, [Online] vol. 26, No. 3, available online Jun. 7, 2004, pp. 223-231, XP004671064, ISSN: 0261-3069.

(Continued)

*Primary Examiner* — John J Zimmerman

(74) *Attorney, Agent, or Firm* — General Electric Company; Sushupta T. Sudarshan; Domenica N. S. Hartman

(57) ABSTRACT

A coating and process for depositing the coating on a substrate. The coating is a nickel aluminide overlay coating of predominantly the beta (NiAl) and gamma-prime ($Ni_3Al$) intermetallic phases, and is suitable for use as an environmental coating and as a bond coat for a thermal barrier coating (TBC). The coating can be formed by depositing nickel and aluminum in appropriate amounts to yield the desired beta+gamma prime phase content. Alternatively, nickel and aluminum can be deposited so that the aluminum content of the coating exceeds the appropriate amount to yield the desired beta+gamma prime phase content, after which the coating is heat treated to diffuse the excess aluminum from the coating into the substrate to yield the desired beta+gamma prime phase content.

39 Claims, 4 Drawing Sheets

(56) References Cited

U.S. PATENT DOCUMENTS

| | | | | |
|---|---|---|---|---|
| 5,965,274 | A | 10/1999 | Deevi et al. | |
| 5,975,852 | A | 11/1999 | Nagaraj et al. | |
| 6,153,313 | A | 11/2000 | Rigney et al. | |
| 6,255,001 | B1 | 7/2001 | Darolia | |
| 6,291,084 | B1 | 9/2001 | Darolia et al. | |
| 6,403,165 | B1 * | 6/2002 | Grylls et al. | 427/456 |
| 6,475,642 | B1 | 11/2002 | Zhao et al. | |
| 6,620,524 | B2 | 9/2003 | Pfaendtner et al. | |
| 6,933,058 | B2 * | 8/2005 | Darolia | 428/610 |
| 7,247,393 | B2 * | 7/2007 | Hazel et al. | 428/680 |
| 7,250,225 | B2 * | 7/2007 | Hazel et al. | 428/680 |
| 7,264,888 | B2 * | 9/2007 | Darolia et al. | 428/680 |
| 7,326,441 | B2 * | 2/2008 | Darolia et al. | 427/328 |
| 7,544,424 | B2 * | 6/2009 | Gorman et al. | 428/652 |
| 2001/0013383 | A1 | 8/2001 | Takahashi et al. | |
| 2001/0053424 | A1 | 12/2001 | Schaeffer | |
| 2003/0134139 | A1 * | 7/2003 | Pfaendtner et al. | 428/621 |
| 2004/0229075 | A1 | 11/2004 | Gleeson et al. | |
| 2005/0118453 | A1 | 6/2005 | Darolia | |

OTHER PUBLICATIONS

Zhenyu Liu and Wei Gao; Oxidation Behavior of Cast Ni3A1 Alloys and Microcrystalline Ni3A1+ 5% Cr Coatings With and Without Y Doping; Oxidation of Metals, vol. 55, Nos. 5/6, 2001.

H.P. Ng, X.K. Meng and A.H.W. Ngan; An Investigation into the Fabrication and Properties of Ni3A1 Thin Coatings on Nickel Substrates; Pergamon, Scripta Materialia, vol. 39, No. 12, pp. 1737-1742, Elsevier Science Ltd., Jul. 24, 1998.

R.L. McCarron, N.R. Lindblad and D. Chatterji; Environmental Resistance of Pure and Alloyed YNi3A1 and B-NiA1; presented during Corrosion/75, Apr. 14-18, 1975, Toronto, Ontario, Canada, CORROSION—NACE, vol. 32, No. 12, Dec. 1976.

Tiwari R. et al: "Cavitation-Erosion of Plasma Sprayed Nickel Alumindes", Proceedings of the 1993 National Thermal Spray Conference, Anaheim, CA, Jun. 7-11, 1993.

Singh J. et al.: "Microstructure of Laser Clad Ni-Cr-Al-Hf Alloy on a Y' Strengthened Ni-Base Superally", Metallurgical Transactions: vol. 19A, Aug. 1988.

Chen J H et al, "Degradation of the Platinum Aluminide Coating on CMSX4 at 1100 Degrees C," Surface and Coatings Technology, Jun. 1, 1997, pp. 69-77, vol. 92, No. 1-2, Elsevier, Amsterdam, Netherlands.

Taylor A et al, "Constitution of Nickel-rich Alloys of Nickel-chromium-aluminium System," Journal of the Institute of Metals, May 1952, pp. 451-464, vol. 81, No. 9, Institute of Metals, London, Great Britain.

Office Action dated Jan. 17, 2012 from European Patent Office, relates to corresponding European Application No. 05256663.5.

Office Action dated Sep. 24, 2008 from European Patent Office, relates to corresponding European Application No. 05256663.5.

* cited by examiner

COATING SYSTEMS CONTAINING BETA PHASE AND GAMMA-PRIME PHASE NICKEL ALUMINIDE

CROSS REFERENCE TO RELATED APPLICATIONS

This is a division patent application of U.S. patent application Ser. No. 10/904,844, filed Dec. 1, 2004, now U.S. Pat. No. 7,326,441, which is a continuation-in-part patent application of U.S. patent application Ser. No. 10/904,220, filed Oct. 29, 2004, now U.S. Pat. No. 7,264,888.

BACKGROUND OF THE INVENTION

This invention relates to coatings of the type used to protect components exposed to high temperature environments, such as the hostile thermal environment of a gas turbine engine. More particularly, this invention is directed to an overlay coating predominantly containing beta (β) phase and gamma-prime (γ') phase nickel aluminide, which may be alloyed to exhibit enhanced environmental properties.

Certain components of the turbine, combustor and augmentor sections that are susceptible to damage by oxidation and hot corrosion attack are typically protected by an environmental coating and optionally a thermal barrier coating (TBC), in which case the environmental coating is termed a bond coat that in combination with the TBC forms what may be termed a TBC system. Environmental coatings and TBC bond coats are often formed of an oxidation-resistant aluminum-containing alloy or intermetallic whose aluminum content provides for the slow growth of a strong adherent continuous aluminum oxide layer (alumina scale) at elevated temperatures. This thermally grown oxide (TGO) provides protection from oxidation and hot corrosion, and in the case of a bond coat promotes a chemical bond with the TBC. However, a thermal expansion mismatch exists between metallic bond coats, their alumina scale and the overlying ceramic TBC, and peeling stresses generated by this mismatch gradually increase overtime to the point where TBC spallation can occur as a result of cracks that form at the interface between the bond coat and alumina scale or the interface between the alumina scale and TBC. More particularly, coating system performance and life have been determined to be dependent on factors that include stresses arising from the growth of the TGO on the bond coat, stresses due to the thermal expansion mismatch between the ceramic TBC and the metallic bond coat, the fracture resistance of the TGO interface (affected by segregation of impurities, roughness, oxide type and others), and time-dependent and time-independent plastic deformation of the bond coat that leads to rumpling of the bond coat/TGO interface. Therefore, advancements in TBC coating system are concerned with delaying the first instance of oxide spallation affected by the above factors.

Environmental coatings and TBC bond coats in wide use include alloys such as MCrAlX overlay coatings (where M is iron, cobalt and/or nickel, and X is yttrium or another rare earth element), and diffusion coatings that contain aluminum intermetallics, predominantly beta-phase nickel aluminide and platinum aluminides (PtAl). Because TBC life depends not only on the environmental resistance but also the strength of its bond coat, bond coats capable of exhibiting higher strength have also been developed, a notable example of which is beta-phase NiAl overlay coatings. In contrast to the aforementioned MCrAlX overlay coatings, which are metallic solid solutions containing intermetallic phases, the NiAl beta phase is an intermetallic compound present within nickel-aluminum compositions containing about 25 to about 60 atomic percent aluminum. Examples of beta-phase NiAl overlay coatings are disclosed in commonly-assigned U.S. Pat. No. 5,975,852 to Nagaraj et al., U.S. Pat. No. 6,153,313 to Rigney et al., U.S. Pat. No. 6,255,001 to Darolia, U.S. Pat. No. 6,291,084 to Darolia et al., and U.S. Pat. No. 6,620,524 to Pfaendtner et al. These NiAl compositions, which preferably contain a reactive element (such as zirconium and/or hafnium) and/or other alloying constituents (such as chromium), have been shown to improve the adhesion of a ceramic TBC, thereby increasing the spallation resistance of the TBC. The presence of reactive elements such as zirconium and hafnium in beta-phase NiAl overlay coatings has been shown to improve environmental resistance as well as strengthen the coating, primarily by solid solution strengthening of the beta-phase NiAl matrix. However, if the solubility limits of the reactive elements are exceeded, precipitates of a Heusler phase ($Ni_2AlZr$ (Hf, Ti, Ta)) can form that can drastically lower the oxidation resistance of the coating due to preferential internal oxidation of these precipitates.

The suitability of environmental coatings and TBC bond coats formed of NiAlPt to contain the gamma phase (γ-Ni) and gamma-prime phase (γ'-$Ni_3Al$) is reported in U.S. Patent Application Publication No. 2004/0229075 to Gleeson et al. The NiAlPt compositions evaluated by Gleeson et al. contained less than about 23 atomic percent (about 9 weight percent or less) aluminum, and between about 10 and 30 atomic percent (about 12 to 63 weight percent) platinum. According to Gleeson et al., the compositions were predominantly made up of the gamma and gamma prime phases, with substantially no beta phase. Pt-containing gamma+gamma prime coatings modified to further contain reactive elements are also contemplated by Gleeson et al.

Even with the above advancements, there remains a considerable and continuous effort to further increase the service life of environmental coatings and TBC systems.

BRIEF SUMMARY OF THE INVENTION

The present invention generally provides a protective overlay coating and a process for depositing such a coating on a substrate, such as the surface of an article used in a hostile thermal environment, including the turbine, combustor and augmentor sections of a gas turbine engine. The invention is particularly directed to a nickel aluminide overlay coating of predominantly the beta (NiAl) and gamma-prime ($Ni_3Al$) phases. The beta and gamma-prime phases employed in the present invention are stable intermetallic compounds of nickel and aluminum. The gamma prime-phase exists for NiAl compositions containing nickel and aluminum in an atomic ratio of about 3:1, while beta-phase nickel aluminide exists for NiAl compositions containing nickel and aluminum in an atomic ratio of about 1:1. Accordingly, the beta+gamma prime phase nickel aluminide overlay coating of this invention is compositionally distinguishable from other overlay coating compositions that contain only the beta-phase or combined gamma and gamma prime phases.

According to a first aspect of the invention, the overlay coating is used in a coating system deposited on a substrate and, as discussed above, contains both the beta phase and the gamma-prime phase of nickel aluminide intermetallic. The coating has desirable environmental and mechanical properties that render it useful as an environmental coating and as a bond coat for a thermal barrier coating (TBC). A second aspect of the invention is a process by which an intermetallic overlay coating containing beta and gamma-prime nickel aluminide intermetallic phases is formed on a substrate. According to one such process, nickel and aluminum are co-deposited on a substrate in amounts appropriate to form substantially in situ the desired beta and gamma-prime phases. According to another process of the invention, nickel and aluminum are deposited on a substrate to form a preliminary coating having a preliminary aluminum content, and the substrate and preliminary coating are then heat treated to diffuse a sufficient amount of aluminum from the preliminary coating into the substrate so that the desired beta and gamma-prime phases are obtained. In so doing, the resulting intermetallic overlay coating has a lower aluminum content than the preliminary coating.

The beta+gamma-prime phase nickel aluminide intermetallic overlay coating of this invention is believed to have a number of advantages over existing overlay coatings that contain only the beta-phase or combined gamma and gamma prime phases. According to the invention, reactive elements such as zirconium and hafnium have a higher solubility limit in the gamma-prime phase than the beta-phase. As such, the present invention enables significantly greater amounts of reactive elements to be incorporated into a beta phase-containing overlay coating to further improve its environmental resistance and strength without undesirably leading to precipitation of reactive element-rich phases that would promote internal oxidation of the coating. Because of this difference in solubility, overlay coatings of the present invention are characterized by a gamma-prime phase that tends to have a higher reactive element content than the beta phase of the coating. The composition of the overlay coating is also more chemically similar to superalloy compositions on which the overlay coating may be deposited, especially in terms of aluminum content. As a result, there is a reduced tendency for aluminum (and other coating constituents) to diffuse from the overlay coating into the substrate, thereby reducing the likelihood that a deleterious SRZ will form in the superalloy. The gamma-prime phase is also capable of serving as a strengthening phase for the beta phase, enabling overlay coatings of this invention to better inhibit spallation events brought on by stress-related factors. Finally, the coating of this invention achieves the above advantages while retaining advantages associated with the beta phase, which is believed to exhibit superior oxidation resistance and corrosion resistance while also capable of being strengthened through alloying with reactive elements.

Other objects and advantages of this invention will be better appreciated from the following detailed description.

DETAILED DESCRIPTION OF THE INVENTION

Figure 1:
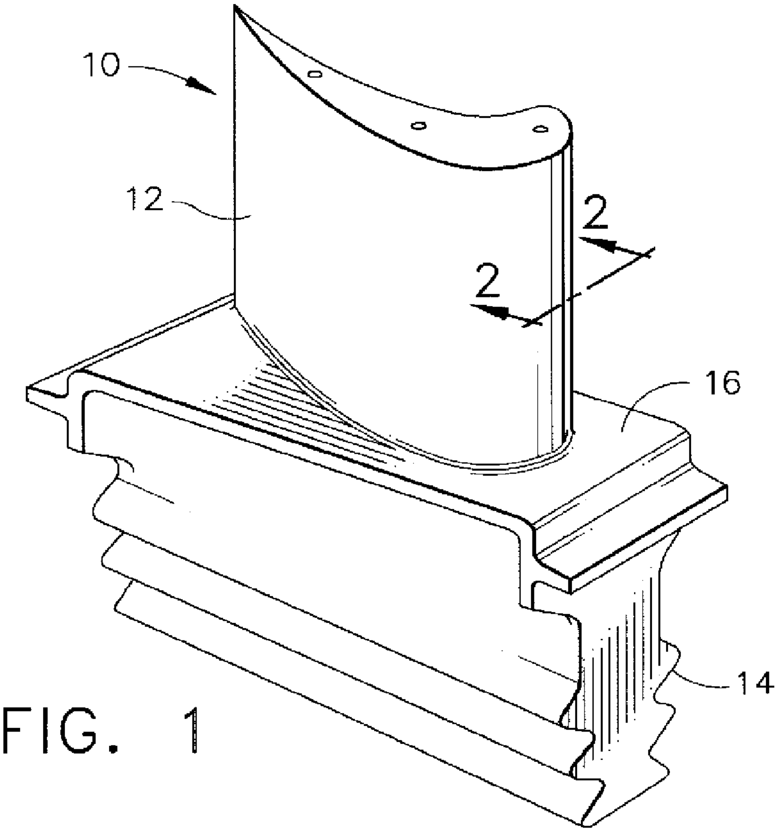
FIG. 1 is a perspective view of a high pressure turbine blade.

The present invention is generally applicable to components that operate within environments characterized by relatively high temperatures, and are therefore subjected to severe thermal stresses and thermal cycling. Notable examples of such components include the high and low pressure turbine nozzles and blades, shrouds, combustor liners and augmentor hardware of gas turbine engines. One such example is the high pressure turbine blade 10 shown in FIG. 1. The blade 10 generally includes an airfoil 12 against which hot combustion gases are directed during operation of the gas turbine engine, and whose surface is therefore subjected to severe attack by oxidation, corrosion and erosion. The airfoil 12 is anchored to a turbine disk (not shown) with a dovetail 14 formed on a root section 16 of the blade 10. While the advantages of this invention will be described with reference to the high pressure turbine blade 10 shown in FIG. 1, the teachings of this invention are generally applicable to any component on which a coating system may be used to protect the component from its environment.

Figure 2:
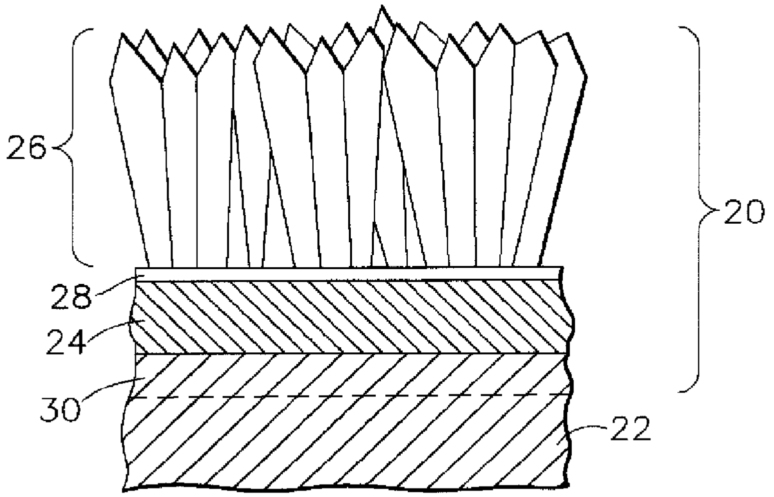
FIG. 2 is a cross-sectional view of the blade of FIG. 1 along line 2-2, and shows a thermal barrier coating system on the blade in accordance with an embodiment of this invention.

Represented in FIG. 2 is a TBC system 20 of a type that benefits from the teachings of this invention. As shown, the coating system 20 includes a ceramic layer (TBC) 26 bonded to the blade substrate 22 with an overlay coating 24, which therefore serves as a bond coat to the TBC 26. The substrate 22 (blade 10) is preferably formed of a superalloy, such as a nickel-base superalloy, though it is foreseeable that the substrate 22 could be formed of another material.

To attain the strain-tolerant columnar grain structure depicted in FIG. 2, the TBC 26 is preferably deposited by physical vapor deposition (PVD), such as electron beam physical vapor deposition (EBPVD), though other deposition techniques could be used including thermal spray processes. A preferred material for the TBC 26 is an yttria-stabilized zirconia (YSZ), with a suitable composition being about 3 to about 20 weight percent yttria (3-20% YSZ), though other ceramic materials could be used, such as yttria, nonstabilized zirconia, and zirconia stabilized by other oxides. Notable alternative materials for the TBC 26 include those formulated to have lower coefficients of thermal conductivity (low-k) than 7% YSZ, notable examples of which are disclosed in commonly-assigned U.S. Pat. No. 6,586,115 to Rigney et al., U.S. Pat. No. 6,686,060 to Bruce et al., U.S. Pat. No. 6,808,799 to Darolia et al., U.S. Pat. No. 6,890,668 to Bruce et al., and U.S. Pat. No. 7,060,365 to Bruce, and in U.S. Pat. No. 6,025,078 to Rickerby. Still other suitable ceramic materials for the TBC 26 include those that resist spallation from contamination by compounds such as CMAS (a eutectic of calcia, magnesia, alumina and silica). For example, the TBC can be formed of a material capable of interacting with molten CMAS to form a compound with a melting temperature that is significantly higher than CMAS, so that the reaction product of CMAS and the material does not melt and infiltrate the TBC. Examples of CMAS-resistant coatings include alumina, alumina-containing YSZ, and hafnia-based ceramics disclosed in commonly-assigned U.S. Pat. Nos. 5,660,885, 5,683,825, 5,871,820, 5,914,189, 6,627,323, 6,720,038 and 6,890,668, whose disclosures regarding CMAS-resistant coating materials are incorporated herein by reference. Other potential ceramic materials for the TBC include those formulated to have erosion and/or impact resistance better than 7% YSZ. Examples of such materials include certain of the above-noted CMAS-resistant materials, particularly alumina as reported in U.S. Pat. Nos. 5,683,825 and 6,720,038. Other erosion and impact-resistant compositions include reduced-porosity YSZ as disclosed in commonly-assigned U.S. Pat. No. 6,982,126 and commonly-assigned U.S. patent application Ser. No. 10/708,020, fully stabilized zirconia (e.g., more than 17% YSZ) as disclosed in commonly-assigned U.S. patent application Ser. No. 10/708,020, and chemically-modified zirconia-based ceramics. The TBC 26 is deposited to a thickness that is sufficient to provide the required thermal protection for the underlying substrate 22 and blade 10, generally on the order of about 100 to about 300 micrometers.

As with prior art TBC systems, an important role of the overlay coating 24 is to environmentally protect the substrate 22 when exposed to an oxidizing environment, and to provide a reservoir of aluminum from which an aluminum oxide surface layer (alumina scale) 28 grows to promote adhesion of the TBC 26. According to the invention, the overlay coating 24 is predominantly of beta phase and gamma-prime phase nickel aluminide (NiAl and $Ni_3Al$), preferably with limited alloying additions. Depending on its composition, the overlay coating 24 can be deposited using a single step or multiple step deposition process, with or without a subsequent heat treatment. An adequate thickness for the overlay coating 24 is about 0.5 mil (about ten micrometers) in order to protect the underlying substrate 22 and provide an adequate supply of aluminum for formation of the alumina scale 28, though thicknesses of up to about 3 mils (about 75 micrometers) are also suitable.

The gamma prime-phase exists for NiAl compositions containing nickel and aluminum in an atomic ratio of about 3:1, while beta-phase nickel aluminide exists for NiAl compositions containing nickel and aluminum in an atomic ratio of about 1:1. On the basis of these ratios, the gamma prime-phase is, by weight, about 86.7% nickel and about 13.3% aluminum, and the beta phase is, by weight, about 68.5% nickel and about 31.5% aluminum. To contain both the beta and gamma-prime intermetallic phases, the overlay coating 24 of this invention preferably contains nickel and aluminum in an atomic ratio between 3:1 and 1:1. An aluminum content lower limit of about 14 weight percent (about 26 atomic percent) is preferred to obtain both the beta and gamma-prime phases while avoiding the gamma (Ni) phase. An upper aluminum limit of about 22 weight percent (about 38 atomic percent) is generally necessary to form a desired amount of the gamma-prime phase, generally about 10 volume percent or more of the coating 24. A preferred aluminum content is in the range of about 15 to about 22 weight percent (about 28 to about 38 atomic percent), which will yield a gamma-prime phase content in a range of about 85 to about 10 volume percent in the coating 24. It should be noted that these ranges are made in reference to the binary nickel-aluminum system, and that the limits of the aluminum content range can vary by several percent points if other alloying elements are present in the coating 24, such as chromium.

Reactive elements such as zirconium, hafnium, yttrium, cerium, tantalum, etc. are preferred alloying additives for the coating 24. The addition of one or more reactive elements to the overlay coating 24 in a combined amount of at least 0.2 weight percent is preferred for promoting the oxidation or environmental resistance and strength of the beta and gamma-prime phases. During investigations leading to the present invention, it was determined that the solid solubility of zirconium in coatings having a relatively high aluminum content is relatively low (about 0.4 to about 0.5 wt. %), leading to precipitation of Zr-rich phases at grain boundaries of the beta-NiAl phase. The investigation also showed that, while higher zirconium levels (above about 0.7 or 0.9 weight percent) are preferred for improving the life of a TBC deposited on a beta-phase coating, internal oxidation of the Zr-rich precipitates decreases the oxidation resistance of the coating. Counter intuitive to the general concept that higher aluminum contents in the beta-phase field lead to better performance as a result of a greater supply of aluminum for formation of the alumina scale 28, the present invention is based on the determination that lowering the aluminum content, resulting in precipitation of gamma-prime phases, can lead to improved oxidation performance.

Figure 3:
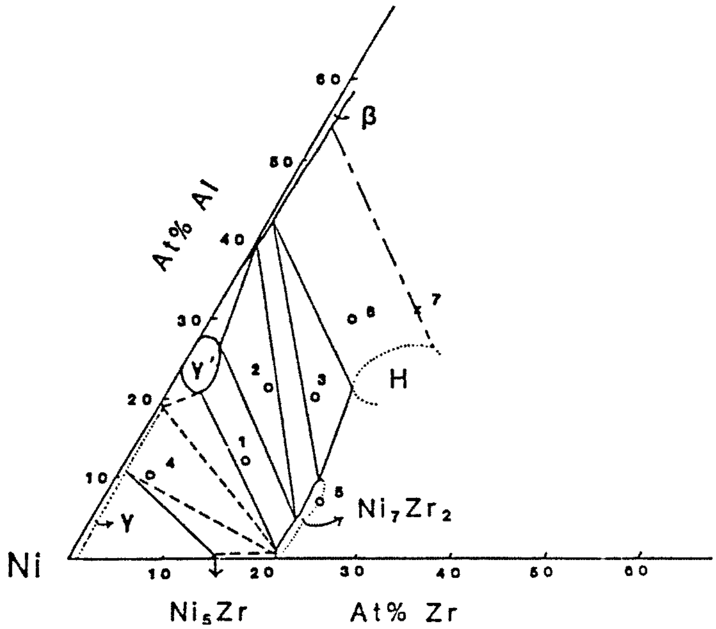
FIG. 3 shows the nickel-rich region of the ternary phase diagram for the Ni—Al—Zr system.

FIG. 3 shows the nickel-rich region of the ternary phase diagram for the Ni—Al—Zr system at 1100° C. The diagram shows that the level of solubility of zirconium in the gamma-prime phase is far greater than that in the beta phase. This diagram suggests that inclusion of the gamma-prime phase in a beta-phase coating would enable higher levels of zirconium to be added to the coating without precipitating Zr-rich phases in the beta phase. Rather than increasing internal oxidation behavior (associated with rapid weight gain increase), coatings containing both the beta and gamma-prime phases would have a wider window of the preferred oxidation behavior (lower weight gain rates). The overall effect is believed to be a slow release of zirconium to the growing alumina scale 28 overtime, rather than internal oxidation of Zr-rich phases at the grain boundaries of the coating. It was speculated that the ability to employ higher levels of zirconium might also improve alumina scale and TBC spallation resistance through solid solution strengthening of the coating, on the basis that a stronger coating would be more resistant to stress-induced rumpling.

On the basis of the beta and gamma-prime phase contents of the overlay coating 24 of this invention, an upper limit for the combined or individual reactive element content is believed to be about 4 weight percent in order to avoid exceeding the solubility limits of the individual reactive elements in the gamma-prime phase. Preferred reactive elements are zirconium and hafnium, with preferred ranges of about 0.2 to about 1.4 weight percent for zirconium and about 0.6 to about 4 weight percent for hafnium. As will be discussed below, depending on the process by which the coating 24 is formed and the composition of the substrate 22, certain elements are likely to unintentionally diffuse into the coating 24 from the substrate 22. Notably, tantalum is a desirable reactive element and often present in superalloys at levels that will promote the diffusion of tantalum from the substrate 22 into the overlay coating 24. As such, the coating process and the substrate composition must the considered when determining the amount of reactive element(s) to be intentionally added to the coating 24.

Optional alloying additives for the coating 24 include chromium and silicon. A suitable chromium content is about 2 to about 15 weight percent to promote the corrosion resistance of the overlay coating 24 as well as help in the formation of the alumina scale 28, especially when the aluminum content of the coating 24 is near the lower end of its above-noted range. A preferred chromium content is about 2 to about 5 weight percent. Limited additions of silicon are believed to have a strong beneficial effect on oxidation resistance in gamma-prime phase compositions. However, silicon must be controlled to not more than about 2 weight percent to avoid excessive interdiffusion into the substrate 22.

On the basis of the above, the nickel content of the coating 24 may be as high as about 85 weight percent (such as when aluminum and one or more reactive elements are the only other constituents of the coating 24) to ensure that the coating 24 contains both the beta and gamma-prime phases. On the other hand, nickel contents of as low as about 57 weight percent may exist if the coating 24 contains the maximum levels of aluminum, reactive element(s), chromium, and silicon contemplated for the coating 24. Because of the previously-noted tendency for interdiffusion in any process used to form the coating 24, the coating 24 may contain up to about 5 weight percent of elements that were not deposited with the intentional coating constituents. In addition to tantalum, such as elements are likely to include tungsten, rhenium, molybdenum, etc., which are often present in superalloy compositions and tend to readily diffuse at the high temperatures often associated with coating processes and encountered by superalloy components.

Processes suitable for producing the overlay coating 24 of this invention can be adapted to take advantage of the tendency for interdiffusion between the coating 24 and substrate 22. One such process is to deposit nickel and aluminum on the substrate 22 to form a preliminary coating containing aluminum in excess of that necessary to form the relative amounts of beta and gamma-prime phases desired for the coating 24. In other words, nickel and aluminum are co-deposited at an atomic ratio of less than 3:1 and approaching the 1:1 atomic ratio for the beta phase, such that the preliminary coating is predominantly the beta phase. As an example, the preliminary coating may contain about 24 to about 30 weight percent aluminum, the balance nickel. The substrate 22 and preliminary coating are then heat treated to intentionally diffuse aluminum from the coating into the substrate 22 to the extent that the aluminum level of the coating falls within the above-noted range necessary to form an effective amount of the gamma-prime phase, e.g., below 22 weight percent. A suitable heat treatment for this purpose involves a higher temperature and longer treatment than that typically used to stress-relieve prior art beta-phase overlay coatings. For example, a suitable treatment entails a temperature of 1100° C. or greater, such as about 1120° C. or more, for a duration of about four to sixteen hours. Alternatively, nickel and aluminum can be co-deposited on the substrate 22 to form in situ the beta and gamma-prime phases of the coating 24 by properly tailoring the relative amounts of nickel and aluminum, i.e., limiting the as-deposited aluminum content to a range of about 14 to about 22 weight percent as previously discussed.

The performance benefits afforded by the present invention have been demonstrated with overlay coatings containing nickel, aluminum, chromium, and zirconium in amounts that, when processed in accordance with the invention, yielded the desired beta and gamma-prime phases. The coatings were deposited using standard EBPVD processes on pin specimens formed of the known nickel-base superalloy René N5 (nominal composition of, by weight, about 7.5% Co, 7.0% Cr, 6.5% Ta, 6.2% Al, 5.0% W, 3.0% Re, 1.5% Mo, 0.15% Hf, 0.05% C, 0.004% B, 0.01% Y, the balance nickel and incidental impurities). The as-deposited coatings had a typical aluminum content of about 25 weight percent (about 42 atomic percent), a typical chromium content of about 5 weight percent (about 4.5 atomic percent), and a typical zirconium content of about 0.5 weight percent (about 0.25 atomic percent), with the balance essentially nickel. As a result, the as-deposited coatings were predominantly of the beta phase. One set of six pins with coating thicknesses of about 50 micrometers was designated as baseline and underwent a two-hour diffusion heat treatment at about 2000° F. (about 1090° C.) in a vacuum, which is a conventional stress-relieving heat treatment used when processing fully beta-phase NiAl coatings. The baseline pins further underwent light grit blasting (LGB), which is routinely performed on beta-phase NiAl+Zr coatings (such as the baseline coatings) in order to densify the upper surface of the coatings to inhibit oxidation via the columnar gaps and grain boundaries of such coatings. Two additional sets of six pins each were designated as experimental and vacuum heat treated at about 1125° C. (about 2050° F.) for durations dependent on the coating thickness: about four hours for 25 micrometer-thick coatings, and sixteen hours for 50 micrometer-thick coatings. The purpose of the higher-temperature, longer-duration experimental heat treatments was to promote the diffusion of aluminum from the coating into the substrate in order to alter the phase content and chemistry distribution in the experimental coatings.

Figure 4:
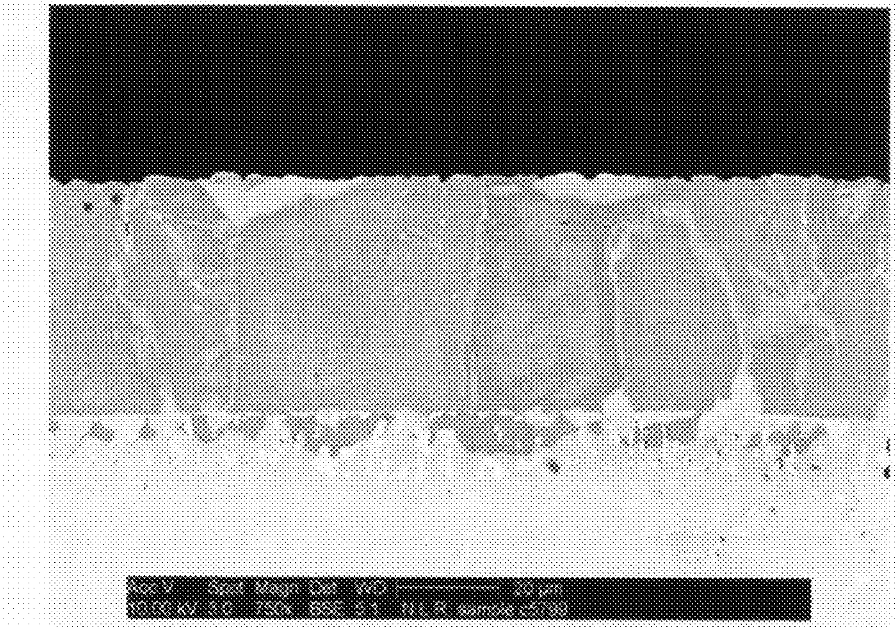
FIGS. 4 and 5 are scanned images of an overlay coating formed predominantly of the beta and gamma-prime phases in accordance with an embodiment of this invention.
Figure 5:
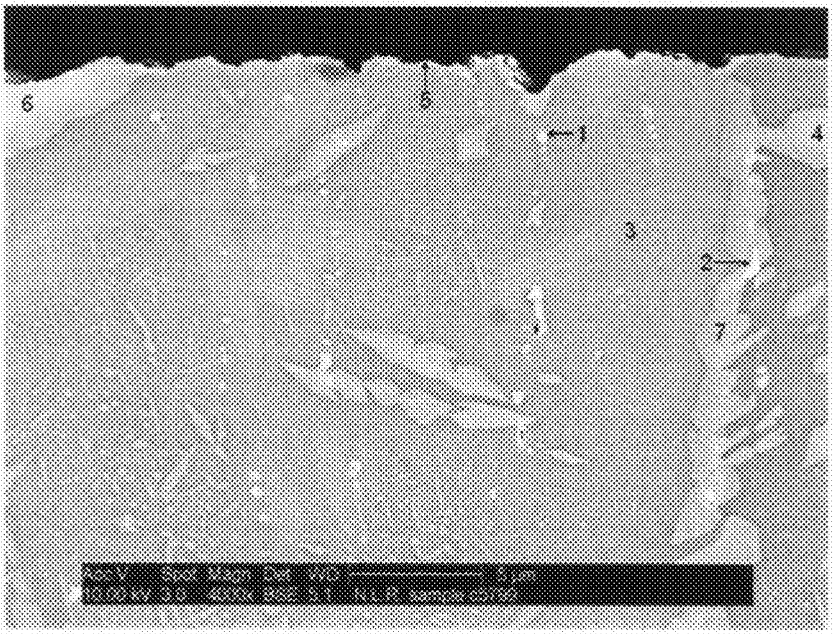

Scanned images of two micrographs of one of the resulting experimental coatings are shown in FIGS. 4 and 5, with FIG. 5 being a magnified image of the central surface region in FIG. 4. The lighter phases visible in FIG. 5 are gamma-prime. EDS results, summarized below, showed that the gamma-prime phases had higher zirconium levels than the remaining matrix, which was predominantly beta-phase NiAl.

| | Region | | | | | | |
|---|---|---|---|---|---|---|---|
| Element | 1 | 2 | 3 | 4 | 5 | 6 | 7 |
| Ni | 66.3 | 66.2 | 74.1 | 74.3 | 63.8 | 74.6 | 79.0 |
| Al | 16.8 | 11.2 | 20.1 | 10.9 | 15.7 | 10.7 | 12.8 |
| Zr | 3.4 | 4.3 | 0.0 | 0.2 | 5.5 | 0.5 | 0.2 |
| Ta | 7.8 | 12.1 | 0.4 | 5.4 | 9.4 | 5.5 | 1.0 |
| Cr | 0.6 | 0.5 | 0.8 | 0.5 | 0.5 | 0.4 | 0.6 |
| Co | 3.0 | 2.5 | 3.3 | 3.2 | 2.6 | 3.0 | 3.0 |
| Mo | 0.3 | 0.6 | 0.2 | 1.0 | 0.2 | 0.7 | 0.8 |
| W | 1.4 | 2.3 | 0.9 | 4.6 | 1.3 | 4.4 | 2.0 |
| O | 0.7 | 0.6 | 0.3 | 0.5 | 1.5 | 0.4 | 0.4 |

The above data indicate that the coating had a two-phase structure of primarily beta-phase matrix (region 3) with zirconium and tantalum-enriched gamma-prime phases (e.g., regions 1, 2, and 5). Tantalum and the other refractory metals detected in the coating were present as a result of interdiffusion that occurred between the coating and the underlying nickel-base superalloy during the extended heat treatment.

Figure 6:
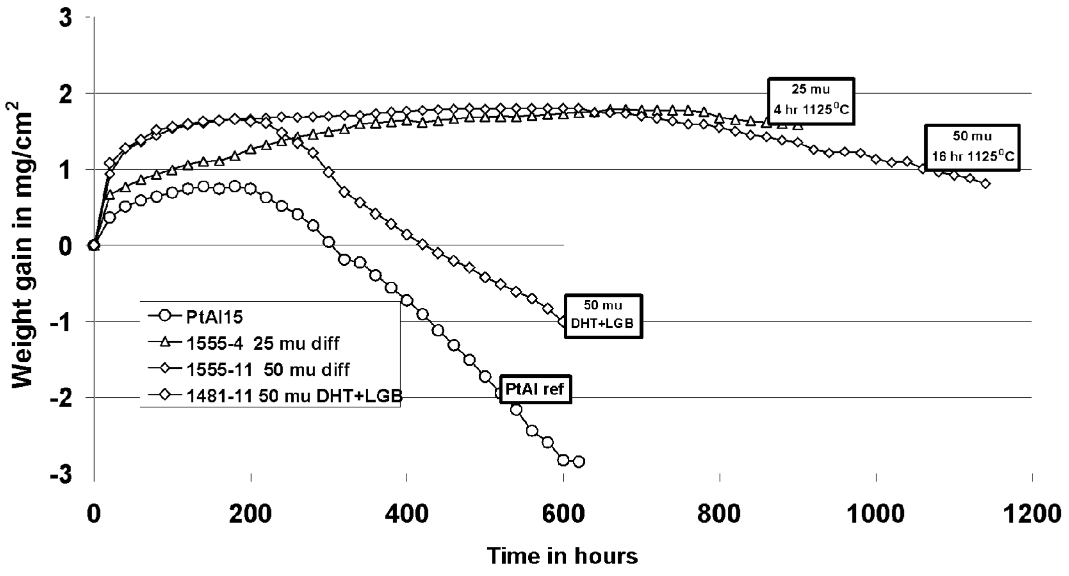
FIG. 6 is a graph representing the oxidation resistance of beta+gamma prime phase overlay coatings of this invention in comparison to beta-phase nickel aluminide overlay coatings and platinum aluminide diffusion coatings of the prior art.

The pins were subjected to an oxidation study at 2200° F. (about 1200° C.) using 20-hour cycles, the results of which are represented in FIG. 6. As indicated in FIG. 6, pins with conventional platinum aluminide (PtAl) diffusion coatings also underwent the same oxidation test. Weight change was recorded as a function of time/test cycle. Weight gains evidence formation of alumina scale (28 in FIG. 2) as a result of oxidation, while weight loss evidences spallation of alumina scale. The weight gain curves show that all NiAl overlay coatings had greater scale adherence than the PtAl diffusion coatings, in spite of the fact that the NiAl coatings has a higher initial weight gain. While the baseline specimens, i.e., those that underwent the conventional diffusion heat treatment (DHT), exhibited better oxidation properties than the PtAl diffusion coatings, the experimental pins that underwent the higher-temperature, longer-duration heat treatment exhibited considerably better oxidation properties, including better alumina scale adhesion as evidenced by the minimal weight loss indicated in FIG. 6. Consequently, contrary to conventional wisdom regarding aluminum levels in aluminum-base coatings, the two-phase (beta+gamma prime phase) experimental coatings with reduced aluminum levels exhibited improved resistance to alumina scale spallation as compared to the single-phase (beta phase) baseline coatings with higher aluminum high levels. It was concluded that the higher levels of zirconium and substrate elements (such as tantalum in the grain boundaries) also contributed to the improved spallation resistance.

Figure 7:
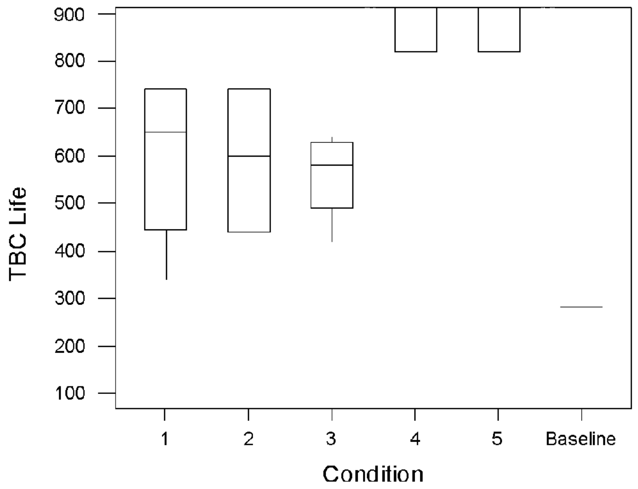
FIG. 7 is a graph representing the TBC spallation resistance obtained with beta+gamma prime phase overlay coatings of this invention in comparison to beta-phase nickel aluminide overlay coatings and platinum aluminide diffusion coatings of the prior art.

A second investigation was then undertaken to evaluate the influence that a beta+gamma prime NiAl coating has on TBC life. A 2125° F. (about 1160° C.) furnace cycle test (FCT) was used to evaluate specimens identified in FIG. 7 as prepared according to five different processing conditions. All specimens were formed of the N5 superalloy. Seven to nine specimens were prepared according to each of conditions 1, 2, or 3, while ten specimens were prepared according to each of conditions 4 and 5. Eight specimens processed to have conventional PtAl diffusion coatings were also prepared, and designated as "baseline" in FIG. 7. Specimens prepared according to conditions 1 through 5 were provided with nickel aluminide overlay bond coats having a nominal composition of, by weight, about 25% aluminum, about 5% chromium, and about 0.63% zirconium, the balance nickel. Specimens prepared according to condition 1 had a nominal coating thickness of about 50 micrometers and underwent the FCT evaluation as-deposited. The specimens prepared according to conditions 2 and 3 had a nominal coating thickness of about 50 micrometers and, similar to the specimens of the first investigation, underwent a heat treatment at about 1090° C. for a duration of about two hours, with the condition 3 specimens further undergoing a light grit blasting treatment similar to that performed on the specimens of the first investigation. Finally, the condition 4 and 5 specimens underwent essentially the same extended heat treatment described in the previous investigation: the condition 4 specimens had 50 micrometer-thick coatings that underwent a sixteen-hour 1125° C. heat treatment, and the condition 5 specimens had 25 micrometer-thick coatings that underwent a four-hour 1125° C. heat treatment. As a result of their as-deposited compositions and heat treatments, the condition 1 through 3 specimens were predominantly of the beta phase, and the condition 4 and 5 specimens were predominantly of the beta phase prior to heat treatment and predominantly of the beta and gamma-prime phases following heat treatment. Finally, the baseline specimens indicated in FIG. 7 were provided with conventional PtAl diffusion coatings.

A 125 micrometer-thick layer of 7% YSZ was then deposited on each of the specimens using conventional EBPVD processing. All specimens then underwent furnace cycle testing and were examined following every cycle for TBC spallation. Specimens were removed from test if spallation exceeded 20 percent of the original coated surface area. From FIG. 7, it can be seen that the coatings prepared under conditions 1 through 5 outperformed the baseline PtAl diffusion coatings, exhibiting average TBC lives of more than twice the average of the PtAl diffusion coated specimens (about 280 cycles). However, all of the condition 4 and 5 specimens outperformed the condition 1 through 3 coatings, with each specimen completing at least 820 cycles without spallation, and seventeen of the twenty specimens exceeding 960 cycles without spallation. The greater spallation resistance exhibited by the coatings containing both the beta phase and the gamma-prime phase was attributed to the greater strength of the coatings. Examination of the specimens showed that those prepared according to conditions 4 and 5 were free of zirconium-rich precipitates, while internal oxidation attributed to the presence of zirconium-rich precipitates was observed in those specimens prepared according to conditions 1 through 3.

While the invention has been described in terms of a preferred embodiment, it is apparent that other forms could be adopted by one skilled in the art. Accordingly, the scope of the invention is to be limited only by the following claims.

The invention claimed is:

1. A coating system on a metallic substrate, the coating system comprising an intermetallic overlay coating of about 10 to about 85 volume percent of the gamma-prime nickel aluminide intermetallic phase and the balance essentially beta nickel aluminide intermetallic phase, wherein the intermetallic overlay coating comprises, by weight, at least 14% aluminum.

2. The coating system according to claim 1, wherein the intermetallic overlay coating comprises, by weight, at least 14% to about 22% aluminum.

3. The coating system according to claim 1, wherein the intermetallic overlay coating comprises, by weight, at least 15% aluminum.

4. The coating system according to claim 1, wherein the intermetallic overlay coating comprises, by weight, at least 15% to about 22% aluminum.

5. The coating system according to claim 1, wherein the intermetallic overlay coating further comprises at least one reactive element in an amount up to about 4 weight percent.

6. The coating system according to claim 5, wherein the at least one reactive element is at least one of zirconium, hafnium, yttrium, and cerium.

7. The coating system according to claim 5 wherein the at least one reactive element is zirconium in an amount of about 0.2 to about 1.4 weight percent.

8. The coating system according to claim 5 wherein the at least one reactive element is hafnium in an amount of about 0.6 to about 4 weight percent.

9. The coating system according to claim 1, wherein the intermetallic overlay coating further comprises at least one of chromium and silicon.

10. The coating system according to claim 9 wherein the intermetallic overlay coating contains about 2 to about 15 weight percent chromium.

11. The coating system according to claim 9, wherein the intermetallic overlay coating contains about 2 to about 5 weight percent chromium.

12. The coating system according to claim 1, wherein the intermetallic overlay coating consists of, by weight, at least 14% to about 22% aluminum, optionally about 2% to about 15% chromium, optionally up to about 4% of at least one reactive element, and the balance nickel, incidental impurities, and elements present in the substrate.

13. The coating system according to claim 1, wherein the intermetallic overlay coating consists of, by weight, at least 14% to about 22% aluminum, about 2% to about 15% chromium, about 0.2 to about 1.4% zirconium, and the balance nickel, incidental impurities, and elements present in the substrate.

14. The coating system according to claim 1, wherein the intermetallic overlay coating consists of, by weight, at least 14% to about 22% aluminum, about 2% to about 15% chromium, about 0.6 to about 4% hafnium, and the balance nickel, incidental impurities, and elements present in the substrate.

15. The coating system according to claim 1, further comprising a thermal-insulating ceramic layer adhered to the intermetallic overlay coating.

16. The coating system according to claim 1, wherein the intermetallic overlay coating has a thickness of about 10 to about 75 micrometers.

17. The coating system according to claim 1, wherein the substrate is formed of a superalloy.

18. The coating system according to claim 1, wherein the substrate is a surface region of a gas turbine engine component.

19. The coating system according to claim 18, wherein the surface region is an airfoil region of the gas turbine engine component.

20. The coating system according to claim 18, wherein the substrate is formed of a superalloy.

21. A process of forming the coating system of claim 1, a coating system on a metallic substrate, the process comprising co-depositing nickel and aluminum on the substrate to form in situ the beta and gamma-prime nickel aluminide intermetallic phases of the intermetallic overlay coating, and the intermetallic overlay coating is deposited to contain, by weight, at least 14% aluminum.

22. The process according to claim 21, wherein the intermetallic overlay coating is deposited to contain, by weight, at least 15% to about 22% aluminum.

23. The process according to claim 21, wherein the forming step further comprises depositing at least one reactive element on the substrate in an amount up to 4 weight percent of the intermetallic overlay coating.

24. The process according to claim 23, wherein the at least one reactive element is at least one of zirconium, hafnium, yttrium, and cerium.

25. The process according to claim 21, wherein the forming step further comprises depositing at least one of chromium and silicon.

26. The process according to claim 21, further comprising the step of depositing a thermal-insulating ceramic layer on the intermetallic overlay coating.

27. A coating system on an airfoil surface region of a gas turbine engine component, the coating system comprising an intermetallic overlay coating of about 10 to about 85 volume percent gamma-prime nickel aluminide intermetallic phase and the balance essentially beta nickel aluminide intermetallic phase.

28. The coating system according to claim 27, wherein the intermetallic overlay coating comprises, by weight, at least 14% aluminum.

29. The coating system according to claim 27, wherein the intermetallic overlay coating comprises, by weight, up to 22% aluminum.

30. The coating system according to claim 27, wherein the intermetallic overlay coating comprises, by weight, at least 15% to about 22% aluminum.

31. The coating system according to claim 27, wherein the intermetallic overlay coating comprises at least one reactive element in an amount up to about 4 weight percent.

32. The coating system according to claim 31, wherein the at least one reactive element is zirconium in an amount of about 0.2 to about 1.4 weight percent.

33. The coating system according to claim 31, wherein the at least one reactive element is hafnium in an amount of about 0.6 to about 4 weight percent.

34. The coating system according to claim 27, wherein the intermetallic overlay coating comprises at least one of chromium and silicon.

35. The coating system according to claim 34, wherein the intermetallic overlay coating contains about 2 to about 15 weight percent chromium.

36. The coating system according to claim 27, wherein the intermetallic overlay coating consists of, by weight, at least 14% to about 22% aluminum, optionally about 2% to about 15% chromium, optionally up to about 4% of at least one reactive element, and the balance nickel, incidental impurities, and elements present in the substrate.

37. The coating system according to claim 27, wherein the intermetallic overlay coating consists of, by weight, at least 14% to about 22% aluminum, about 2% to about 15% chromium, about 0.2 to about 1.4% zirconium, and the balance nickel, incidental impurities, and elements present in the substrate.

38. The coating system according to claim 27, wherein the intermetallic overlay coating consists of, by weight, at least 14% to about 22% aluminum, about 2% to about 15% chromium, about 0.6 to about 4% hafnium, and the balance nickel, incidental impurities, and elements present in the substrate.

39. The coating system according to claim 27, further comprising a thermal-insulating ceramic layer adhered to the intermetallic overlay coating.

* * * * *